US006925304B2

(12) United States Patent
Hameleers et al.

(10) Patent No.: US 6,925,304 B2
(45) Date of Patent: Aug. 2, 2005

(54) METHOD FOR DATA CONNECTIONS IN A CELLULAR MOBILE COMMUNICATION NETWORK

(75) Inventors: Heino Hameleers, Kerkrade (NL); Frank Hundscheidt, Kerkrade (NL); Hermann Dingels, Simmerath (DE); Jarle Fjörtoft, Grimstad (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 726 days.

(21) Appl. No.: 09/772,203

(22) Filed: Jan. 29, 2001

(65) Prior Publication Data

US 2001/0027104 A1 Oct. 4, 2001

(30) Foreign Application Priority Data

Jan. 31, 2000 (EP) ............................................ 00101868

(51) Int. Cl.$^7$ ................................................ H04Q 7/20
(52) U.S. Cl. ........................ 455/445; 455/453; 455/436; 370/401
(58) Field of Search ................................ 455/403, 445, 455/453, 436, 446, 450, 452.1, 433, 328, 329, 338, 401; 370/401, 331, 338, 328, 329

(56) References Cited

U.S. PATENT DOCUMENTS

| | | | |
|---|---|---|---|
| 5,850,391 A | | 12/1998 | Essigmann .................. 370/331 |
| 6,130,879 A | * | 10/2000 | Liu ............................. 370/230 |
| 6,504,839 B2 | * | 1/2003 | Valentine et al. ............ 370/354 |
| 6,587,457 B1 | * | 7/2003 | Mikkonen .................... 370/356 |
| 6,594,241 B1 | * | 7/2003 | Malmlof ...................... 370/329 |

FOREIGN PATENT DOCUMENTS

| | | |
|---|---|---|
| WO | WO 99/31911 | 6/1999 |
| WO | WO 99/56456 | 11/1999 |

OTHER PUBLICATIONS

Kokkoraki, A., European Search Report, App. No. EP00101868, Jul. 5, 2000, pp. 1–4.

Jayapalan, J. et al., "Cellular Data Services Architecture and Signaling," IEEE Personal Communications, US, IEEE Communications Society, vol. 1, No. 2, Apr. 1, 1994, pp. 44–55.

GSM 04.22 Version 5.0.0: Dec. 1995, Digital cellular telecommunications system (Phase 2+); Radio Link Protocol (RLP) for data and telematic services on the Mobile Station—Base Station System (MS–BSS) interface and the Base Station System—Mobile–services Switching Centre (SBBMSC) interface pp. 1–63.

Yabusaku, M. et al., "Voice Communication Connection Control in Digital Public Land Mobile Networks," 2334a IEICE Transactions on Fundamentals of Electronics, Communications and Computer Sciences E75–A (Dec., 1992), No. 12, Tokyo, JP.

* cited by examiner

Primary Examiner—Nay Maung
Assistant Examiner—Angelica Perez

(57) ABSTRACT

A payload data connection arrangement within a core network in a cellular mobile communication network reduces the number of transcodings and reduces the number of transmission devices that are linked in by a more flexible handling of interworking functions. This is achieved by comparing possible payload connections between a core network and access networks for both legs of a call. Based on the result of the comparison, only those devices are linked in that are technically necessary. Methods and devices that are used to set-up data connections with said benefits are illustrated and described.

13 Claims, 4 Drawing Sheets

METHOD FOR DATA CONNECTIONS IN A CELLULAR MOBILE COMMUNICATION NETWORK

FIELD OF THE INVENTION

The present invention generally relates to payload data connections in a cellular mobile communication network. More particularly, it relates to payload data connections in a core network within said cellular mobile communication network.

BACKGROUND OF THE INVENTION

Cellular communication networks are increasing significantly in the number of subscribers and the traffic volume they handle. Especially increasing is the data traffic over these communication networks. The introduction of the so-called third generation networks will even accelerate this increase, for example by multi media applications. Operators are looking for effective solutions to handle this increased traffic within their networks. As a variety of different protocols, defining data connection parameters, are in use, adaptations are to be performed within communication networks. These adaptations allow data connections between users whose data are transmitted according to different protocols, for example a fixed network subscriber using an ISDN (Integrated Services Digital Network) protocol and a mobile subscriber using a GSM (Global System for Mobile communication) protocol.

It is state of the art, that protocols used for the transmission of data from a mobile user are adapted by interworking functions. To reduce the number of interworking functions within a communication network, the concept of shared interworking functions has been introduced, for example in GSM networks. In U.S. Pat. No. 5,850,391, a possible implementation of an interworking function is described.

An access network consists at least of access nodes that manage the resources of the access network and provide the user with at least one mechanism to access the core network. Access networks include for example GSM base station subsystems or UMTS (Universal Mobile Telephony Systems) or UTRAN (Umts Terrestrial Radio Access Networks).

A core network consists at least of control nodes that provide support for the network features and telecommunication services. The support provided may include for example the management of user location information and, the control of network features and services the transfer mechanisms for signalling and for payload.

Payload transmission resources are devices that are used for the transmission of payload data, for example interworking functions, transmission converter and routing devices.

A media gateway is a network node that comprises resources for the transmission of payload data. It can be part of the core network or is placed at the edge between core network and access network. For clarity reasons, in the following a media gateway is seen as part of a core network.

A gateway control node is a control node that contacts a home location register.

An interworking function comprises the protocol conversion functionality for data communication within a communication network or between communication networks. It can perform data rate adaptations, buffer data and terminates telecommunication network specific protocols. Some interworking functions also terminate transmission method protocols. Transmission methods are methods for the transmission of data designed for example according to the standards and recommendations for ATM (Asynchronous Transfer Mode), STM (Synchronous Transfer Mode), and IP (Internet Protocol).

Telecommunication networks include for example UMTS (Universal Mobile Telecommunication Systems), GSM (Global System for Mobile communications) and ISDN (Integrated Services Digital Network) networks.

A transmission converter terminates transmission method protocols, bridges data from one transmission method to another transmission method, performs readdressing, packing or unpacking, and transmission of data. A transmission converter can be implemented as a single device, for example as a stand-alone device or in a media gateway or a mobile services switching centre, or distributed, for example in a media gateway. Unlike interworking functions, transmission converters do not impact the protocol levels above a transmission method.

Routing devices are entities, within a media gateway including an incoming point of the media gateway and an outgoing point of said media gateway, that transmit payload data, perform the routing within the media gateway and convert data packages if necessary. If the payload transmission functionality is implemented within a mobile services switching centre MSC instead of a media gateway, routing devices are placed within said mobile services switching centre.

A parameter set describes a connection. For a GSM network, at least the following parameters are included in a parameter set: radio channel requirement, information transfer capability in the case that a UDI (Unrestricted Digital Interface) is used or other information transfer capability in the case that a RDI (Restricted Digital Information) is used, compression, NIRR (Negotiation of Intermediate Rate Requested), rate adaptation, other rate adaptation, sync/async, user rate, intermediate rate, connection element, acceptable channel coding and wanted air interface.

It is useful to include the following parameters:

Number of stop bits, maximum number of traffic channels, and user initiated modification indication.

The mentioned parameters are for example known from the standard GSM 04.08 version 5.6.2. released September 1997.

For an ISDN network the bearer capability as defined in the ITU-T recommendation Q.931, released March 1993, covers the parameter set.

It is a shortcoming of the state of the art that the usage of the interworking functions is performed in a way that does not allow to limit the number transcodings to a minimum number that is technically required.

It is an object of the invention to reduce the number of transcodings within a core network and to reduce the number of payload transmission resources linked into a payload transmission connection.

BRIEF SUMMARY OF THE INVENTION

The invention, in its broad form resides in an apparatus and method for data connections in a cellular mobile communication network with at least one core network and at least one access network, said method comprising the steps of:

receiving a connection request in a first control node of the core network from a first access network;

transferring of a call control from the first control node to a gateway control node interacting with a home location register that manages subscriber data of a called party;

fetching of routing information by the gateway control node from said home location register;

transferring of the call control from the gateway control node to a control node that controls the access network serving the called party;

calculating parameter values describing possible payload connections between the core network and the access networks;

comparing parameter values describing possible payload connections between the core network and the first access network, with parameter values of possible payload connections between the core network and the access network serving the called party;

selecting transcoding and data rate of the payload in the respective payload transmission resources, according to the results of the comparison; and setting up through-connection of the selected payload transmission resources.

The invention also resides in a network node for a cellular communication network that offers data connections comprising a connection calculation unit (CCU71) for the calculation of parameter values describing possible payload connections between said network node and an access network, a parameter comparison unit (PCU71) for the comparison of said calculated parameter values with parameter values received from a further network node and a processing unit (PU71) for handling input and output of parameter values and seizure of payload transmission resources and the set up and through-connection of a payload connection.

The invention resides also in a network node for a cellular communication network that offers data connections comprising a connection calculation unit (CCU72) for the calculation of parameter values describing possible payload connections between said network node and an access network and a processing unit (PU72) for handling input and output of parameter values and the seizure of payload transmission resources and the set up and through-connection of a payload connection.

The invention also resides in a method of operating reliable link protocol, comprising the steps of setting at an exchange identifier negotiation, time out values before an exchange identifier command is sent again, on different values for a call originating user equipment and a call terminating user equipment.

The invention further resides in a computer program stored on computer readable medium or memory which executes a method for data connections as stated supra.

Adventageously, as described hereinafter, parameter values of parameter sets describing possible connections between a core networks and access networks are compared. This enables reduction of the number of transcodings and protocol adaptations and by that the number of devices that have to be linked into a data connection. This also allows a reduction of the number of transcodings and protocol adaptations, and the quality of the transmitted payload data is increased. The method enables to transmit data at the maximum data rate that can be handled on both call legs, also. This allows a very efficient use of network resources.

In a modification, the first control node seizes the first payload transmission resources and, the control node that controls the access network serving the called party seizes the second payload transmission resources before the comparison of parameter values. This allows to implement the method with fewer changes to existing systems. Another advantage is that the seizure allows avoiding erroneous use of payload transmission resources for a different connection in a very simple way.

In a further modification, a great advantage is realized in the execution of a new comparison after at least one selected payload transmission device has been changed. This allows to keep the above mentioned advantages, for example after the execution of a call forwarding on no reply, a call transfer or a call handover.

A further modification allows the use of a transmission converter for the payload transmission. This allows saving one interworking function.

Yet another modification allows the use of only one interworking function within a core network. This allows avoiding unnecessary transcodings and protocol adaptations.

In a further modification, a calling party identification is sent as part of the call control handover. This allows the identification of a connection in a very simple way.

In yet another modification, an identification of the first control node is transmitted, which enables the control node that serves a called party to determine the control node for the comparison in a very simple way.

Expediently, in a further modification, the comparison and selection are performed after the called party has accepted the call. This avoids additional comparisons and selections in case that a call forwarding is performed.

In another modification, different time out values are used in the call originating and the call terminating user equipment. This avoids repeating exchange of identification collisions at direct user equipment to user equipment negotiations.

BRIEF DESCRIPTION OF THE DRAWINGS

A more detailed understanding of the invention may be had from the following description of preferred embodiments, given by way of example and to be understood in conjunction with the accompanying drawing wherein.

In the illustrations and the description, the separation of control nodes, gateway mobile services switching centres and media gateways is done for descriptive reasons. The invention covers also implementations in which two or all three nodes are collocated in one node.

DETAILED DESCRIPTION

Figure 1:
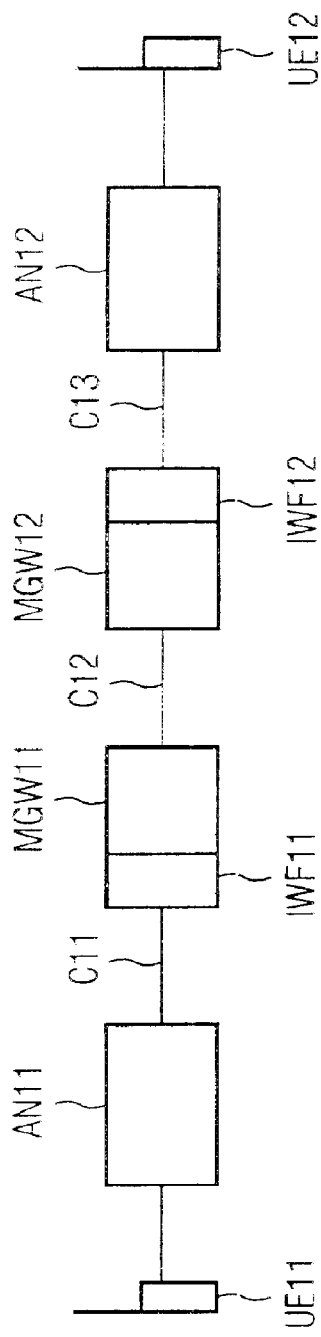
FIG. 1 depicts a payload data connection between two mobile users as in the state of the art.

FIG. 1 depicts a payload data connection between two mobile users as state of the art. A first user equipment UE11, the calling party, is connected to a first access network AN 11. The first access network is connected by a first connection C11 that is described by a first set of parameters via a first interworking function IWF11 to a first media gateway MGW11. The first interworking function IWF11 in the first media gateway MGW11 terminates the protocol used on the first connection C11 and bridges the payload data to the protocol used on a second connection C12. Interworking functions are not necessarily placed between an access network and a core network. They can be placed anywhere within a media gateway or at the edge of a media gateway towards an access network or towards a connection to another media gateway or network. The second connection C12 connects the first media gateway MGW11 to a second media gateway MGW12. The second connection C12 is described by a second parameter set. The second connection C12 can be established via a backbone network. The second media gateway MGW12 is connected via a second interworking function IWF12 to a second access network AN12 by a third connection C13. The third connection is described by a third set of parameters. The second access network is connected to a second user equipment UE12, the called party. At least one user equipment UE11, UE12 is a mobile user equipment. Other kinds of user equipment, can be for example a PSTN (Public Switched Telephone Network) or ISDN network terminal.

Figure 2:
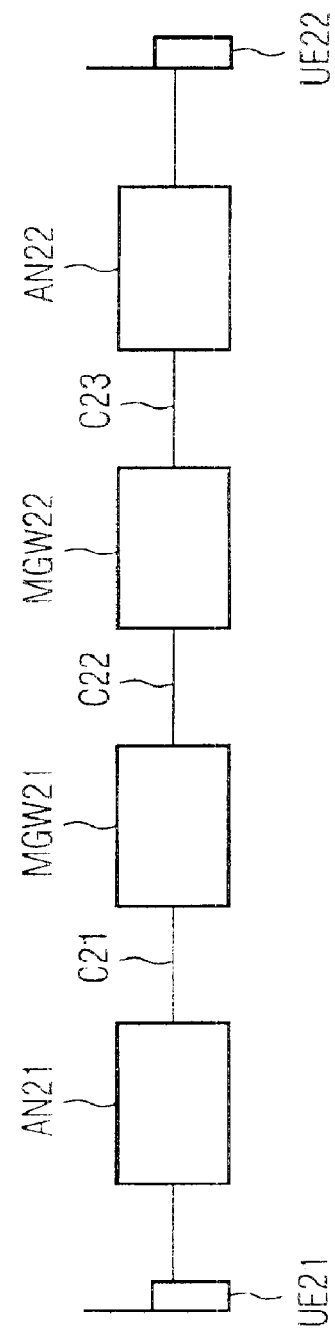
FIG. 2 depicts a payload data connection between two mobile users according to the invention.

FIG. 2 depicts an example of a payload data connection between two mobile user equipment stations UE21 and UE22 according to the invention. A first user equipment UE21 is connected to a first access network AN21. The first access network AN21 transmits payload data, using a first connection C21 described by a first parameter set, to a first media gateway MGW21. Unlike the scenario shown in FIG. 1, no interworking function is linked into the connection C21 between the first access network AN21 and the first media gateway MGW21. The payload is transmitted between the first media gateway MGW21 and a second media gateway via a second connection C22; his connection can be established via a backbone network. The second connection C22 is described by a second parameter set. The second media gateway MGW22 is connected to a second access; network AN22 by a third connection C23. The third connection is described by a third parameter set. The second access network transmits the payload data to the second mobile user equipment UE22. In the example, the values of the parameters in the first parameter set and the third parameter set are equal, and interworking functions are redundant. Rate adaptations that are necessary for the adaptation of the first connection C21 and the third connection C23 to the second connection C22 and vice versa, are handled by transmission converters within the media gateways MGW21 and MGW22. These rate adaptations can be necessary in the event that the second connection C22 requires a constant data rate that is different from the data rates used on the first connection C21 and the third connection C23. This situation occurs for example if the second connection C22 is an STM connection with a data rate of 64 KBPS and the first connection C21 and third connection C23 are 9.6 KBPS data connections. In the case that the second connection C22 does not require a certain data rate, for example an ATM or IP connection, no transmission converter is linked in.

Figure 3:
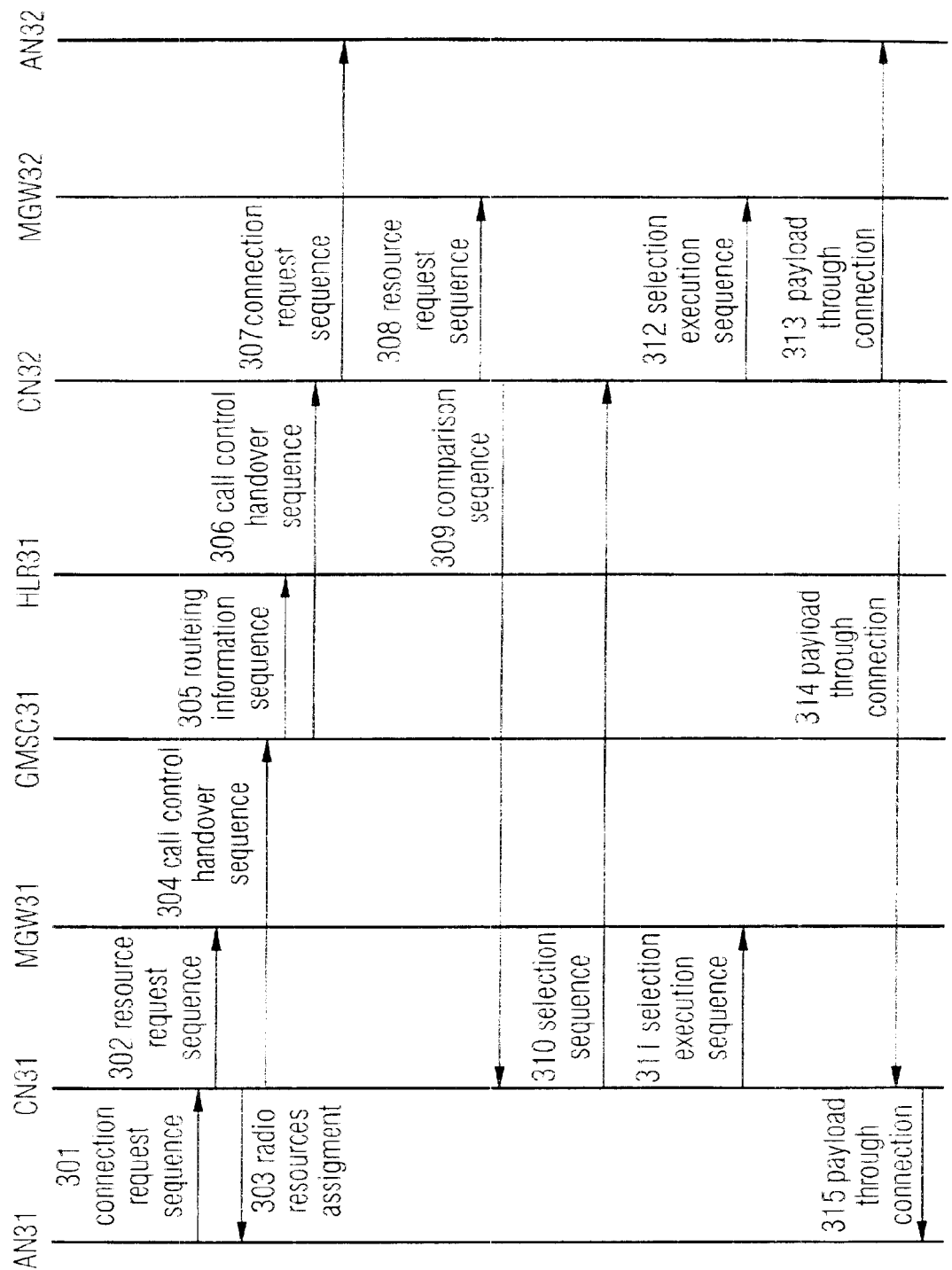
FIG. 3 depicts a possible sequence of steps for a call set up as invented.

FIG. 3 depicts a possible call set up within the core network.

In a connection request sequence 301, a first access network AN31 indicates an incoming call to a first control rode CN31. The indication comprises an identification of a calling party, a called party and a payload connection circuit connecting the first access network AN31 and a first media gateway MGW31, the media gateway being at least partly controlled by the first control node CN31.

The payload connection circuit can be a virtual circuit.

In a resource request sequence 302, the first control node CN31 seizes resources for a payload transmission in the first media gateway MGW1.

In a radio resources assignment 303, a payload connection towards a calling party is set up and confirmed. The resource request sequence 302 is optional. It can be fully replaced by the selection execution sequence 311. In that case, the radio resources assignment 303 is performed after the selection execution sequence 311.

In a call control handover sequence 304, the first control node CN31 passes the call control on to a gateway mobile services switching centre GMSC31. In this procedure the first control node CN31 sends an identification of the called party, the calling party and the resources seized in the first media gateway MGW31.

The gateway mobile services switching centre GMSC31 fetches routing information for the payload connection from a home location register HLR31 in a routing information sequence 305.

According to this routing information, the gateway mobile services switching centre GMSC31 selects a second control node CN32 that serves the called party. The gateway mobile services switching centre GMSC31 passes the call control to the selected second control node CN32 in a second call control handover sequence 306. In the second call control handover sequence 306, the gateway mobile services switching centre GMSC31 sends at least an identification of the calling party, the called party and the call. In the example, it also includes an identification of the first control node CN31 and of the resources selected in the first media gateway MGW31. A calling party number identifies the calling party. These identifications can be sent by the home location register HLR31 to a visited location register that is colocated together with the second control node CN32, too.

In a connection request sequence 307, the second control node selects a second media gateway MGW32 according to the information received from the gateway mobile services switching centre GMSC31. The second control node CN32 initiates a call set up towards the called party. This can be performed for example by sending a set up request message to a second access network AN32 that serves the called party. The second access network AN32 returns a message including a parameter set that describes the connection to the called party. The second control node CN32 generates at least one parameter set that describes a possible payload connection between a second media gateway MGW32 and the second access network AN32, the generation being based on the parameter set describing the connection to the called party and resources that are available in the second media gateway MGW32.

In a second resource request sequence 308, the second control node CN32 seizes resources for the payload transmission from the second media gateway MGW32.

The second resource request sequence 308 is optional; the seizure executed in said sequence can be performed in the selection execution sequence 312, alternatively. In a comparison sequence 309, the control nodes CN31 and CN32 compare possible parameter values for a payload connection between the first access network AN31 and the first media gateway MGW31 with possible parameter values for a connection between the second access network AN32 and the second media gateway MGW32. This comparison can be performed by either the first control node CN31 or the second control node CN32, or both of the control nodes. In the example it is invoked by the second control node CN32 and performed by the first control node CN31. Hence, the second control node sends at least one set of parameter values, describing a possible connection between the second media gateway MGW32 and the second access network AN32, to the first control node CN31. If there is at least one equal set of parameter values describing a possible connection between the first media gateway MGW31 and the first access network AN31 and a connection between the second media gateway MGW32 and the second access network AN32, both nodes agree on one set of parameter values. In the example, the first control node CN31 finds a common set of parameter values.

If one of the control nodes CN31 and CN32 does not support the comparison it is not executed. If the second control node CN32 that should invoke the comparison does not support it, no comparison is initiated. The first control node will recognize this at the latest when it receives a message with the information that the called party accepted the call. Then it will through-connect the resources seized in the resource request sequence 302. If the first control node CN31 does not support the comparison, the second control node CN32 will not receive an answer on the invocation of the comparison. After a certain amount of time, it seizes resources for the payload transmission in the second media gateway MGW32 and orders said media gateway to through-connect the payload connection. The steps selection sequence 310, selection execution sequence 311 and selection execution sequence 312 are skipped if at least one of the control nodes CN31 or CN32 does not support the comparison.

In a selection sequence 310, the first control node CN31 sends the common set of parameter values, or an identification of this set, to the second control node CN32. Payload transmission resources are selected by each of the control nodes according to the common parameter values.

In a selection execution sequence 311, the control node CN31 seizes the respective selected resources and orders the through-connection of the payload connection from the first media gateway MGW31.

In a selection execution sequence 312 the control node CN2 seizes the respective selected resources and orders the through-connection of the payload connection from the second media gateway MGW32.

The shown payload through-connection sequences 313, 314, and 315 are used for illustration of the further connection set up, only. They depict one possible implementation and are not described in great detail. In a through-connection sequence 313, the second control node CN32 orders the second access network AN32 to through-connect the payload data connection to the called party. The second access network AN32 returns an indication that the called party accepted the call.

In a through-connection sequence 314, the second control node CN32 indicates the call acceptance to the first control node CN31.

The first control node CN31 passes the indication on to the first access network AN31 and orders the through-connection of the payload connection to the calling party in a through-connection sequence 315.

In a further implementation of the invention, the comparison sequence, the selection sequence and the selection execution sequence can be performed after the called party has accepted the call. In this case, the through-connection of a payload connection towards the second access network AN2 is performed before said sequences. The resource sequence 302 and the second resource sequence 308 are not optional in this case, but are to be performed before the comparison, too.

Figure 4:
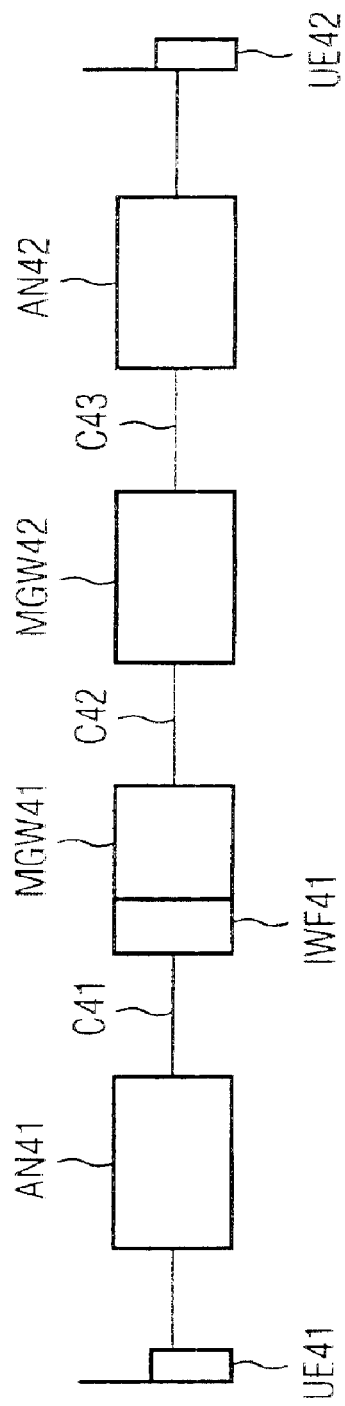
FIG. 4 depicts a payload data connection between two mobile users with different parameter sets that describe the connections between the core network and the access networks according to the invention.

FIG. 4 depicts a payload data connection in the case that the result of comparison sequence is that the parameter set values are different for a first and a third connection. The first user equipment UE41 is connected to the first access network AN41. The first access network AN41 is connected to the first media gateway MGW41 with a connection C41 that is described by a first parameter set. The first media gateway MGW41 is connected to the second media gateway MGW42 by a connection C42 described by a second parameter set. The second media gateway is connected to the second access network AN42 via an interworking function IWF41. This interworking function IWF41 transforms the payload data sent by the first access node AN41 to a third connection C43 described by a third parameter set. The second access network AN42 is connected to the second user equipment UE42. As the parameter set values that describe the first and the third connection differ, the payload date has to be adapted. This may be performed in a single interworking function IWF41. In the example the interworking function is implemented in the first media gateway MGW41 but the invention allows also the implementation in the second media gateway MGW42.

Figure 5:
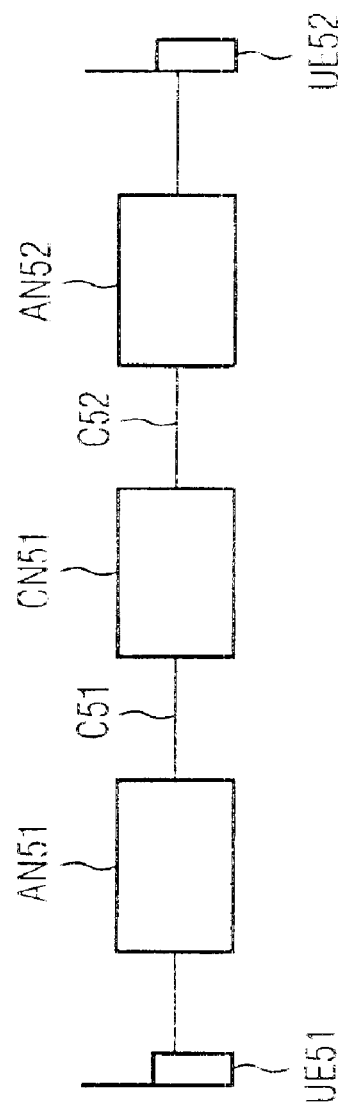
FIG. 5 depicts a payload data connection according to the invention for a communication network wherein call control and bearer control are performed by control nodes.

FIG. 5 depicts a payload data connection according to the invention for a communication network without separation of call control and bearer control. In said network, the payload transmission devices are located in a control node CN51. User equipment UE51 and UE52 are connected via access networks AN51 and AN52 and the connections C51 and C52 to the control node CN51. These connections are the same as described in FIG. 2 for the user equipment CN21 and CN22. The difference between the network described in FIG. 2 and the network described in FIG. 5 is that the control node comprises payload transmission devices, and that there is only one core network node CN51. Hence, the signalling and the payload are transmitted to the same control node. The absence of a further control node is only for clarity reasons and does not limit the invention to the shown network configuration.

Figure 6:
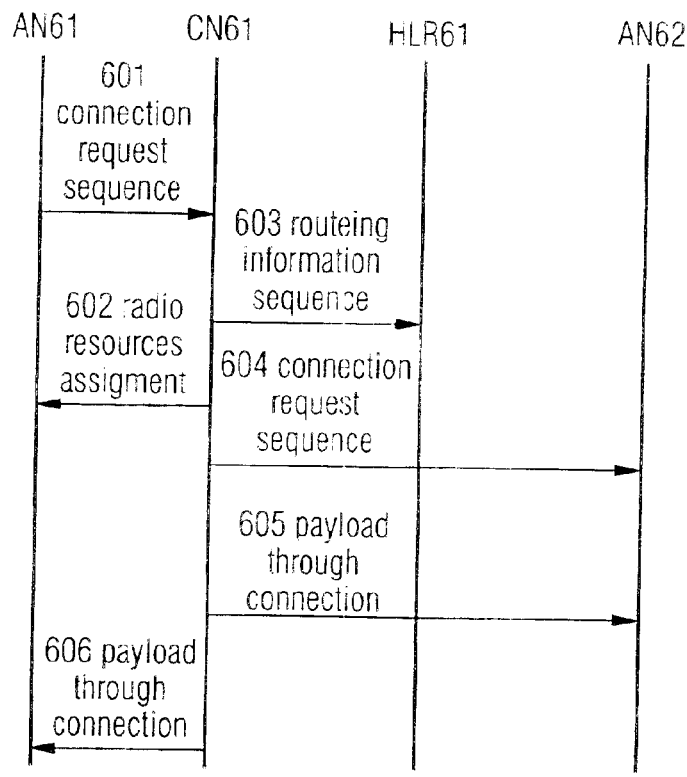
FIG. 6 depicts a possible call set up within a core network in a communication network wherein call control and bearer control are performed by control nodes, and, FIG. 7 depicts two control nodes within a core network in a communication network according to the invention.

FIG. 6 depicts a possible call set up within the core network in a network without separation of call control and bearer control.

In a connection request sequence 601, a first access network AN61 indicates an incoming call to a control node CN61. This indication comprises an identification of a calling party, a called party and a circuit offered for the payload transmission by the first access network AN61 to the first control node CN61.

The payload circuit can be a virtual circuit.

In a radio resources assignment 602, a payload connection towards a calling party is set up and confirmed.

The control node CN61 fetches routing information for the payload connection from a home location register HLR61 in a routing information sequence 603.

According to this routing information, the control node CN61 detects that it serves both calling party and UE62. In a connection request sequence 604, the control node CN61 initiates a call set up towards the called party. This can be performed for example by sending a set up request message to a second access network AN62 that serves the called party. The second access network AN62 returns a message including a parameter set that describes the connection to the called party. The control node CN61 generates at least one parameter set that describes a possible payload connection to the first access network AN61 and at least one parameter set that describes a possible payload connection to the second access network AN62. The generation is based on a parameter set describing the connection to the calling party and a parameter set describing the connection to the user equipment UE62 and resources that are available in the control node CN61.

In a comparison sequence, the control node CN61 compares possible parameter values for a payload connection to the first access network AN61 with possible parameter values for a connection to the second access network AN62.

If there is at least one common set of parameter values, the control node CN61 selects the suitable resources. If there is no common set of parameter values for the connections to the first access network AN61 and the second access network AN62, the control node CN61 selects an interworking function for the payload connection. In a selection execution sequence, the control node CN61 seizes the respective selected resources. The shown payload through-connection sequences 605, and 606 are used for illustration of the further connection set up, only. They depict one possible implementation. In the through-connection sequence 605, the control node CN61 orders the second access network AN62 to through-connect the payload data connection to the second user equipment UE62. The second access network AN62 returns an indication that the called party accepted the call.

In the through-connection sequence 606, the control node CN61 indicates the call acceptance to the first access network AN61 and orders the through-connection of the payload connection to the calling party.

In a further implementation of the invention, the comparison sequence, the selection sequence and the selection execution sequence can be performed after the called party has accepted the call. In this case, the through-connection of a payload connection towards the second access network AN62 is performed before said sequences.

Figure 7:
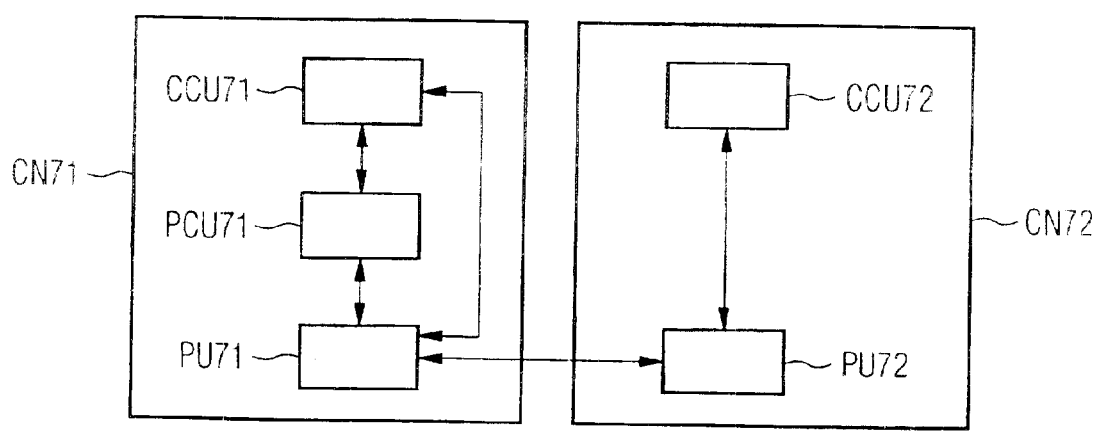

FIG. 7 depicts two control nodes in a core network of a cellular communication network, the first control node CN71 comprising a first connection calculation unit CCU71, a parameter comparison unit PCU71 and a first processing unit PU71. The second control node comprises a second connection calculation unit CCU72 and a second processing unit PIJ72. The connection calculation units CCU71 and CCU72 calculate at least one possible payload connection between the respective access network and a payload transmission device that is at least partly controlled by the control node the connection calculation unit is located in. Each of the possible connections is described by a set of parameters. During the comparison sequence or as an initiation of the comparison sequence, the parameter sets calculated by the second connection calculation unit CCU72 are transmitted by the second processing unit PU72 to the first processing unit PU71. The parameter comparison unit PCU71 receives parameter sets from the first connection calculation unit CCU71 and the first processing unit PU71. The parameter comparison unit PCU71 compares the received parameter sets. If there is at least one equal set of parameter values, this parameter set is returned to both of the processing units PU71 and PU72 together with an indication that an equal set of parameter values is found. If no equal set of parameter values is found, one set of parameters is returned to each of the processing units PU71 and PU72. instead of the parameter sets an identification of the selected parameter set can be returned. The processing units PU71 and PU72 seize resources in the respective payload transmission devices and inform the respective connection calculation units CCU71 and CCU72 about available payload transmission resources. Furthermore, the processing units PU71 and PU72 handle the communication between each other. Connection calculation units and parameter comparison units are not necessarily located in a control node but can be located anywhere in the core network e.g., as stand alone devices.

The invention may have an impact on protocols for data transmission. In some cases it might become increase time out values for the connections. For example in the RLP (Reliable Link Protocol) a so-called XID (eXchange Identifier) negotiation is performed.

First of all, the partners in this negotiation sequence are to be modified to implement the invention in GSM. It is state of the art, that a user equipment and an interworking function are partners in a XID negotiation as explained in the ETSI standard GSM 04.22 Version 7.0.0 published March 1999. As the interworking function is no longer mandatory for a data connection, the negotiation may take place between the user equipment. In the state of the art, one partner sends an XID command to the other partner and starts a timer. It expects an XID response in return. If it receives an XID command, both partners sent an XID command and the negotiation failed. The user equipment will wait a first time out T1, and the interworking function will wait a second time out T2 that is twice of T1. This avoids crossing XID commands between an interworking function and a user equipment at the next attempt. Since the negotiation as described may take place between the two units of user equipment, both units would be waiting for a time out T1 and a new negotiation failure would occur. One possible solution is that the calling party waits for the time out T1 and the called party for the time out T2 before sending a further XID command. The capability of the called party to double its time out has to be indicated for example in the bearer capability information element.

EQUIVALENTS

The foregoing description gives an exemplary rendition of the inventive method for data connections in a cellular mobile communication network. The invention is also directed to an example of a network node, a communication network, a computer program stored in a memory and a method of operating a reliable link protocol. The description illustrates exemplary embodiments and is not to be construed as limiting in any manner. Modifications and equivalents which are intelligible and within the knowledge of one who is skilled are envisaged to be within the scope of the invention, which is defined by the appended claims.

What is claimed is:

1. A method for data connections in a cellular mobile communication network having at least one core network and at least one access network, said method comprising the steps of:

receiving a connection request in a first control node of the core network from a first access network;

transferring of a call control from the first control node to a gateway control node interacting with a home location register that manages subscriber data of a called party;

fetching of routing information by the gateway control node from said home location register;

transferring of the call control from the gateway control node to a control node that controls the access network serving the called party;

seizing first payload transmission resources by the first control node;

seizing second payload transmission resources by the control node controlling the access network serving the called party;

calculating parameter values describing possible payload connections between the core network end the access networks, as defined by the seized first end second payload transmission resources;

comparing parameter values describing possible payload connections between the core network and the first access network, with parameter values of possible payload connections between the core network and the access network serving the called party;

selecting a transcoding technique and a data rate of the payload in the respective payload transmission resources, according to the results of the comparison; and setting up and through-connecting the selected payload transmission resources.

2. Method according to claim 1 including changing a payload transmission and executing a further comparison and selection.

3. Method according to claim 1, including the step wherein at least one transmission converter is linked in for the payload transmission.

4. Method according to claim 1, wherein an interworking function is linked in for the payload transmission.

5. Method according to claim 1, including sending a calling party identification, as part of the call control handover between the control nodes.

6. Method according to claim 1, including the step of sending an identification of the first control node as part of each call control handover between control nodes that occurs after the call control has been handed over to the gateway control node.

7. Method according to claim 1, including the step of performing comparison and selection of transcodings and rate adaptations after the called party accepts the connection.

8. Method according to claim 1, wherein at least two of said control nodes are identical.

9. Method according to claim 1 wherein the access networks are identical.

10. Method according to claim 1, wherein the method is performed in a Universal Mobile Telephone System (UMTS) or a Global System for Mobile Communication (GSM) network.

11. A cellular communication network, comprising a first access network, a second access network and a core network, performing a method for the set up of data connections according to claim 1.

12. A computer program stored on computer readable medium or in a computer memory that can execute a method according to claim 1.

13. A core network control node for a cellular communication network having at least one core network and at least one access network, said core network control node comprising:

means for receiving a connection request from a first access network;

means for seizing first payload transmission resources between the core network and the first access network;

means for transferring call control functions from the core network control node to a gateway control node that fetches routing information for a called party from a home location register, and transfers the call control functions to an access network control node that controls a second access network that serves the called party, wherein the access network control node seizes second payload transmission resources between the core network and the second access network;

a connection calculation unit that calculates parameter values describing possible payload connections between the core network and the first access network, as defined by the seized first payload transmission resources;

a parameter comparison unit that compares the calculated parameter values with parameter values received from the access network control node; end a processing unit for handling input and output of parameter values, seizure of payload transmission resources, and setup and through-connection of a payload connection.

* * * * *